United States Patent [19]

Graff

[11] Patent Number: 4,944,716
[45] Date of Patent: Jul. 31, 1990

[54] WIRE NETTING BELT

[75] Inventor: Wilhelm Graff, Duren, Fed. Rep. of Germany

[73] Assignee: GKD Gebr. Kufferath GmbH & Co. KG, Duren, Fed. Rep. of Germany

[21] Appl. No.: 389,522

[22] Filed: Aug. 4, 1989

[30] Foreign Application Priority Data

Aug. 19, 1988 [DE] Fed. Rep. of Germany ....... 3828210

[51] Int. Cl.⁵ .............................................. F16H 3/06
[52] U.S. Cl. .................................. 474/255; 24/33 C; 198/844
[58] Field of Search ................................. 474/253–259; 198/832, 833, 844, 848; 428/295; 24/31 R, 31 W, 33 C, 33 M, 38, 39

[56] References Cited

U.S. PATENT DOCUMENTS

| | | | |
|---|---|---|---|
| 2,158,007 | 5/1939 | Ellis et al. | 474/255 |
| 2,468,898 | 5/1949 | Shingle | 474/255 |
| 3,165,800 | 1/1965 | Stolz | 24/33 C |
| 4,344,209 | 8/1982 | Harwood | 198/844 X |

*Primary Examiner*—Thuy M. Bui
*Attorney, Agent, or Firm*—Body, Vickers & Daniels

[57] ABSTRACT

Wire netting belt, more particularly for conveyors, screen belt presses or the like, which is closed at its belt ends by an insert-type join to constitute an endless belt and is strengthened in its plane in its end regions with reinforcing strips consisting of a solidifying composition, to obviate arching of the belt at its central zone in the end regions.

17 Claims, 2 Drawing Sheets

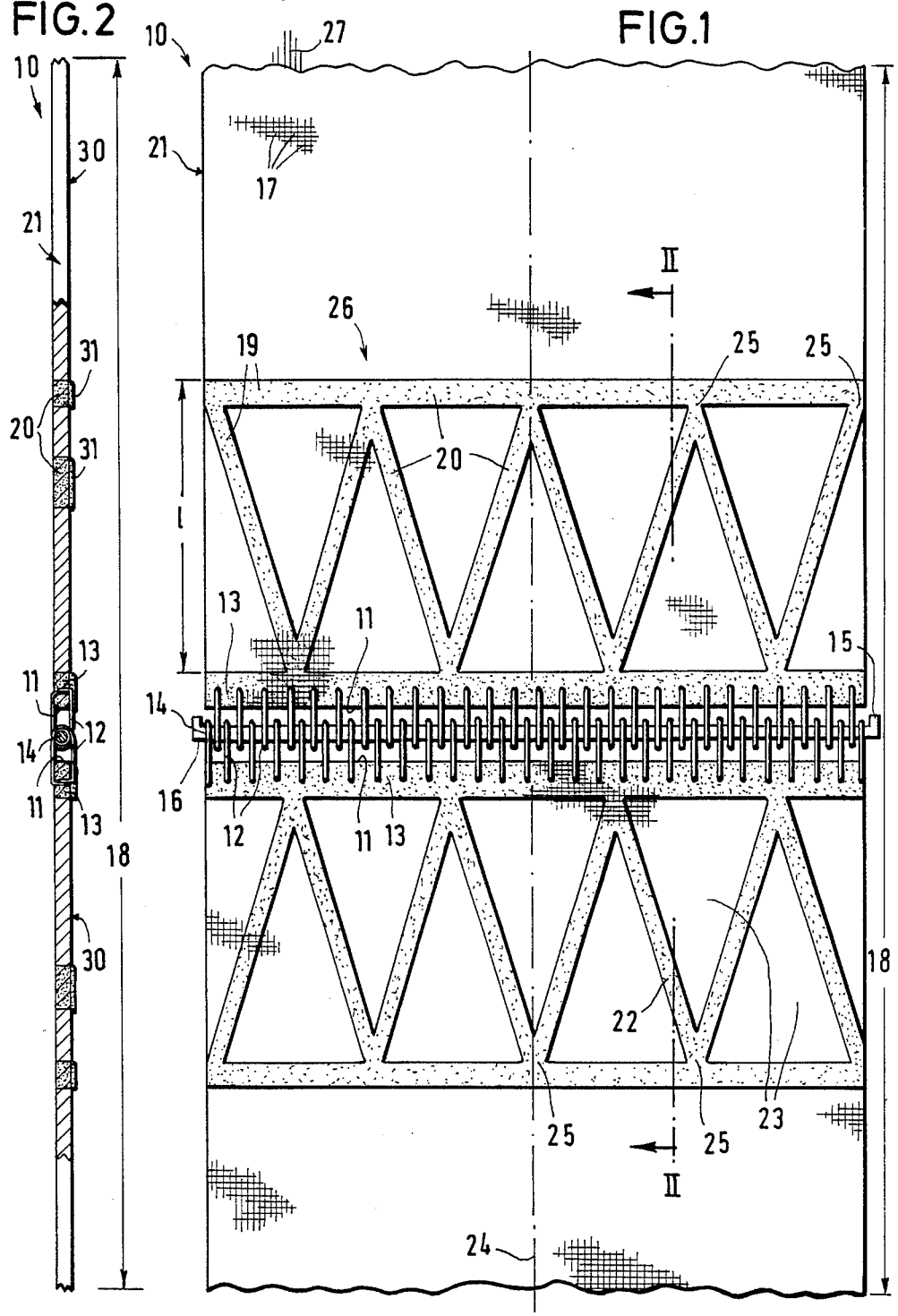

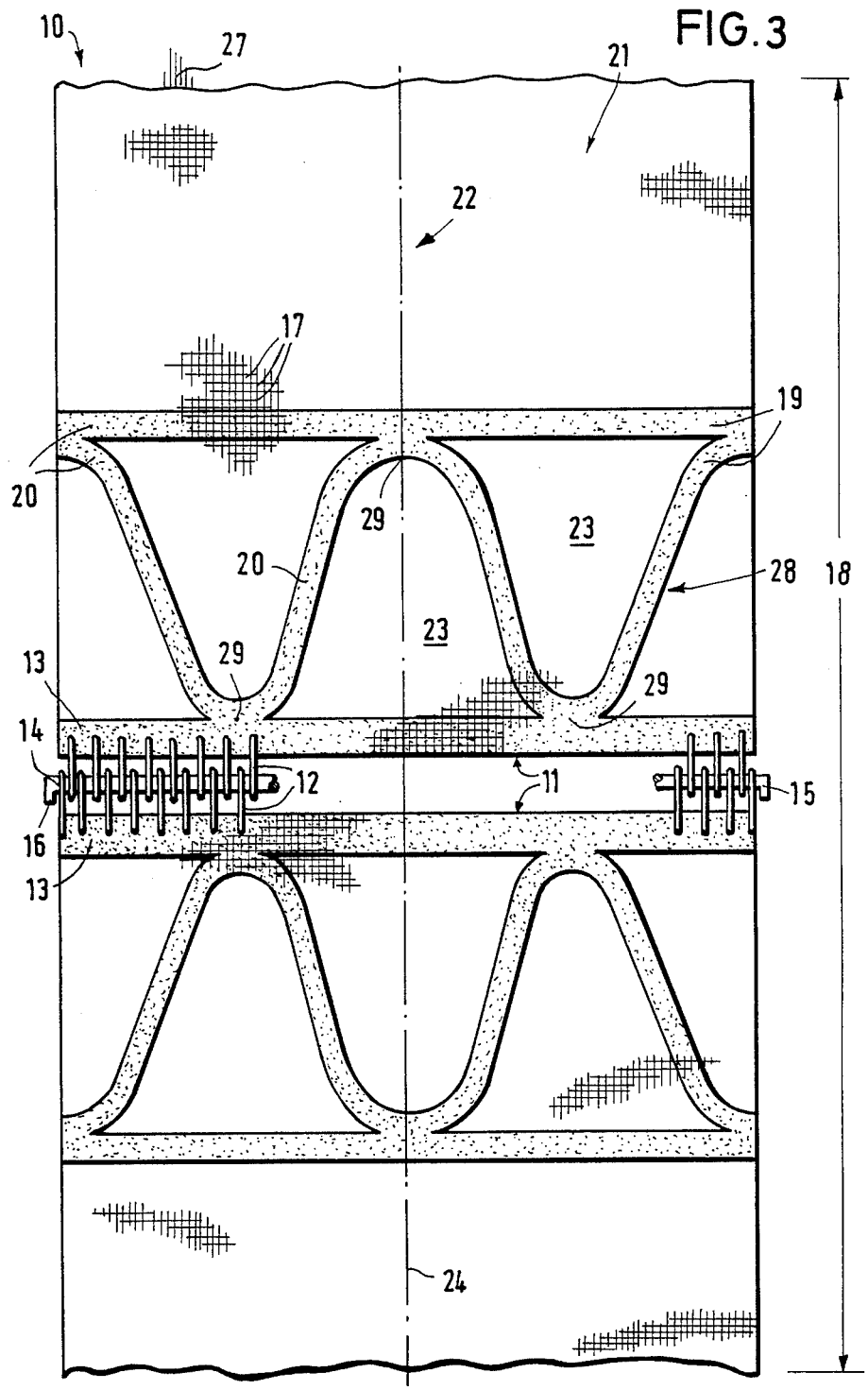

WIRE NETTING BELT

FIELD OF THE INVENTION

The invention relates to a wire netting belt such as are used in conveyors, screen belt presses and the like, which is joined at its ends to constitute an endless belt.

BACKGROUND OF THE INVENTION

In belts of this kind it is known for the belt ends to be connected to one another by a thin bar inserted through a plurality of eyelets which are clipped to the belt ends and additionally secured by a synthetic plastic material adhesive, the bar being inserted through eyelets of one belt end and the other belt end alternately. Under loading from the material being conveyed, the belt of netting bends more in the middle than at its edges since the central wires are under more stress than the edge region wires. As a result, greater extension in the longitudinal direction occurs in the middle of the netting belt than in the edge regions, so that the belt bulges in the middle of the belt and protrudes at e.g. guide rollers of the machine. Consequently a fold is produced in the belt in the region of the transverse seam or join, parallel to the direction of travel of the belt, and this tends to cause increased wear of the netting belt and tearing of the latter in the region of the joint. Hitherto this tearing could be obviated only by connecting the parts of the wire netting belt not with an insert joint but with a woven joint to form an endless belt. But the production of a woven joint involves considerably more expense, and an endless belt with a woven joint can be used only in conveyor apparatus having a construction allowing the netting belt to be fitted sideways into the apparatus.

SUMMARY OF THE INVENTION

The object of the invention is to avoid folding of the belt in the region of a transverse joint involving an elongate insert, without losing the advantages of this type of joint in the fitting of the belt.

The invention achieves this object in that, over a limited length of the belt ends, at least a proportion of the meshes of the netting is filled with a solidifying composition. As a result the tendency of the various netting wires in this region to shift or twist relatively to one another is reduced, and they lie in a stiffened, aligned structure beside one another. It thus becomes possible for the belt ends to remain straight and parallel relative to one another, and warping of the belt ends in the middle relatively to one another is obviated.

More particularly, the invention provides a wire netting belt having:
first and second belt ends, and end regions of the belt at said first and second ends respectively;
an elongate connecting element;
linking means being engageable by the elongate connecting element to join the belt ends together, and
a reinforced portion of each said end region of the belt, each said reinforced portion comprising a flexible solidified composition filled into the meshes of the belt end regions over a limited length thereof.

It has been found advantageous to make the solidifying composition penetrate the netting to the entire thickness of the said netting. As a result there is obtained a composite material with the netting belt as the basic matrix, the individual wires being secured adhesively to each other with no risk of the composition becoming detached. A preferred solidifying composition is a two-component adhesive substance having a polyurethane base, which reliably secures the individual netting wires adhesively to one another but remains sufficiently flexible and elastic to avoid the risk of breaking even under considerable bending forces e.g. at guide or turn-round rollers of a machine. In addition it is preferred that the composition is not distributed uniformly over the relevant area of the belt ends but is instead arranged in the form of stiffening strips in the netting over at least part of that area. Application of the adhesive substance uniformly over a large area might reduce the flexibility of the belt in the joint regions to the extent that, at the transitions between reinforced and non-reinforced wire fabric, a fracture might come about. Therefore it is sensible to provide the composition as stiffening strips in the netting e.g. to form a lattice with triangular interstices. Alternatively the stiffening strips may form curved lines in a "corrugated" or undulating pattern in the wire netting belt. A further advantage of the arrangement using strips is that the wire netting belt remains very substantially pervious even in the region of its belt ends.

For uniform transmission of longitudinal forces it is preferred to arrange such stiffening strips symmetrically with respect to the longitudinal central axis of the wire netting belt. In order to ensure the reinforcing of the end regions of the netting belt even under very high tensile stresses, it is advantageous to provide the reinforcing strips at the rear surface of the netting belt with an extra thickness formed of the solidifying composition, that is, projecting beyond the thickness of the wire mesh itself.

The reinforced portion, e.g. the area with strips, preferably extends the full width of the netting belt.

Further features and advantages of the invention will become apparent from the following description of preferred embodiments and the associated drawings, in which:

BRIEF DESCRIPTION OF THE DRAWINGS

FIG. 1 is a plan view of a wire netting belt embodying the invention, in the region of its belt ends.

FIG. 2 is a cross-section taken along the line II—II in FIG. 1, and

FIG. 3 shows a second embodiment in a view corresponding to that of FIG. 1.

DETAILED DESCRIPTION OF THE PREFERRED EMBODIMENTS

In the drawings, 10 designates a belt made of wire cloth or netting, eyelets 12 being clipped to the belt ends 11 and secured additionally by a securing strip 13 made of synthetic plastics material. A bar 14 connects the belt ends 11, passing through one eyelet 12 of one belt end 11, then through an eyelet 12 of the other belt end 11 and so on alternately The bar 14 is bent over at both ends 15 and 16 to prevent it from slipping out of the eYelets 12.

In the embodiment shown in FIG. 1, stiffening or reinforcing strips 20 are arranged at the belt ends 11 and form in the netting 21 a grid or lattice 22 with triangular spaces or interstices 23. In the region of these stiffening strips 20 which extends from the belt ends 11 over a limited length 1, the belt end regions 18 are filled with a solidifying composition 19 of a synthetic plastic material which is still flexible in the solidified state, e g. a two-component adhesive with a polyurethane base. Between the strips, in the spaces 23, there is no plastic material. Apart from these end regions, the belt is not provided with the plastics reinforcement.

The reinforcing strips 20 which extend at an inclination relative to the longitudinal axis of the belt are situated symmetrically with respect to the longitudinal central axis 24, and are connected to one another at their corner points 25 of convergence at the belt ends 11 by a securing strip 13 made of the same solidifying composition, this strip also securing the eyelets 12 as already mentioned. At the side remote from the belt ends 11 a further reinforcing strip 20 of synthetic plastics material, extending substantially at right angles to the longitudinal central axis 24 of the wire netting belt 10, joins the corner points 25 of the triangles formed by the reinforcing strips 20. The plane lattice 26 thus formed from solidifying composition within the netting reinforces the wire netting belt 10 over this limited length of its end regions 18, preventing relative movements of the wires 27 of the netting in the region of the reinforcing strips 20.

A similar effect is achieved with the embodiment which is illustrated in FIG. 3. Here, the reinforcing strips 20 form, in the end regions 18 of the wire netting belt 10, undulatory lines 28, the peaks 29 of which are connected to one another by the securing strip 13 and by reinforcing strip 20 extending at right angles to the longitudinal central axis 24, respectively.

As will be apparent from FIG. 2, the filled solidifying material forming the pattern 20 is provided at the rear side 30 of the wire netting belt 10 additionally with an extra thickness 31, constituted by extra solidifying composition 19 standing out of the wire netting surface which represents an additional strengthening and reduces the wear on the belt ends.

I claim:

1. A wire netting belt comprising lengths of wire and meshes between adjacent lengths of wire having:
   first and second belt ends, and end regions of the belt at said first and second ends respectively;
   an elongate connecting element;
   linking means at the belt ends, said linking means being engageable by the elongate connecting elemen to join the belt ends together, and
   a reinforced portion of each said end region of the belt said reinforced portions comprising a flexible solidified composition filled into the meshes of the belt regions over a limited length thereof.

2. A wire netting belt as claimed in claim 1, wherein said belt has a thickness and said composition fills the entire thickness of the belt.

3. A wire netting belt as claimed in claim 1 wherein said belt has a thickness and two surfaces and said reinforced portions comprise an additional thickness of said composition standing out from a surface of the belt.

4. A wire netting belt as claimed in claim 1 wherein said composition is a cured two-component polyurethane-based adhesive.

5. A wire netting belt as claimed in claim 1 wherein the reinforced portions comrpise a plurality of spaced strips of composition.

6. A wire netting belt as claimed in claim 5 wherein the spaced strips of the composition form a lattice having interstices providing said spacing.

7. A wire netting belt as claimed in claim 6 wherein the lattice interstices are triangular.

8. A wire netting belt as claimed in claim 5 wherein the strips are undulating in shape.

9. A wire netting belt as claimed in claim 5 wherein said belt has a longitudinal center line, and the strips of said composition form a symmetrical arrangement about the center line.

10. A wire netting belt as claimed in claim 5 wherein at each belt end the spaced strips of said composition form a lattice comprising an end transverse strip, a further transverse strip longitudinally spaced from the end transverse strip, and interconnecting strips extending between said transverse strips to link said end transverse strip and said further transverse strip and thereby form said lattice.

11. A wire netting belt as claimed in claim 10 wherein the interconnecting strips extending between the transverse strips meet the transverse strips obliquely.

12. A wire netting belt as claimed in claim 10 wherein the end transverse strips engage and retain the linking means at the belt ends.

13. A wire netting belt as claimed in claim 10 wherein the strips comprise additional thicknesses of the flexible solidified composition standing out from a surface from the wire netting belt.

14. A wire netting belt as claimed in claim 10 wherein said belt has a longitudinal center line, and the strips of said composition form a symmetrical arrangement about the center line.

15. A wire netting belt as claimed in claim 1 wherein the linking means comprise a plurality of transversely-spaced eyelets at each belt end.

16. In a wire netting belt having adjacent wire lengths and meshes, ends, belt end regions at the belt ends, an elongate transverse insert element, and linking means at the belt ends engageable by the elongate transverse insert element to join the belt ends together, the improvement comprising a lattice of strips of flexibl3 plastic reinforcing material filled into the meshes of the belt over a limited length of said end regions, the lattice comprising for each belt end and end tranverse strip, a further transverse strip longitudinally spaced from said end transverse strip, and plural strips extneding longitudinally between and joining the transverse strips.

17. The improvement as claimed in claim 16, wherein the wire netting belt has a longitudinal center line, and the strips form a symmetrical arrangement about the center line.

* * * * *